United States Patent [19]
Tsang et al.

[11] Patent Number: 6,047,000
[45] Date of Patent: Apr. 4, 2000

[54] PACKET SCHEDULING SYSTEM

[75] Inventors: Danny Hin-Kwok Tsang, Kowloon, The Hong Kong Special Administrative Region of the People's Republic of China; Brahim Bensaou, SG Science Park II, Singapore; King Tung Chan, Tuen Mun, The Hong Kong Special Administrative Region of the People's Republic of China

[73] Assignee: The Hong Kong University of Science & Technology, The Hong Kong Special Administrative Region of the People's Republic of China

[21] Appl. No.: 08/899,757

[22] Filed: Jul. 24, 1997

[51] Int. Cl.[7] .............................. H04L 12/56; G08C 15/00
[52] U.S. Cl. ......................... 370/412; 370/468; 370/235
[58] Field of Search .................................. 370/230, 231, 370/229, 235, 412, 414, 416, 418, 468

[56] References Cited

U.S. PATENT DOCUMENTS

| | | | |
|---|---|---|---|
| 5,313,454 | 5/1994 | Bustini et al. | 370/231 |
| 5,392,280 | 2/1995 | Zheng | 370/394 |
| 5,633,867 | 5/1997 | Ben-Nun et al. | 370/399 |
| 5,796,735 | 8/1998 | Miller et al. | 370/395 |
| 5,850,398 | 12/1998 | King, Jr. | 370/412 |
| 5,864,540 | 1/1999 | Bonomi et al. | 370/235 |

OTHER PUBLICATIONS

Law, Averill M. et al, "*Simulation Modeling and Analysis*", McGraw–Hill, Inc., Second Edition.

*Primary Examiner*—Ajit Patel
*Assistant Examiner*—Saba Tsegaye
*Attorney, Agent, or Firm*—Burns, Doane, Swecker & Mathis, L.L.P.

[57] ABSTRACT

A packet scheduling system is disclosed in which a plurality of first-in-first-out input buffers are provided each corresponding to a respective input data stream to a switching node or multiplexer. Credit is allocated to each stream having packets waiting to be transmitted and which is unable to transmit, and the next stream to be transmitted is based on the allocated credit values, the credit of a transmitted stream being reduced after transmission of a data packet from that stream.

10 Claims, 2 Drawing Sheets

PACKET SCHEDULING SYSTEM

FIELD OF THE INVENTION

This invention relates to a packet scheduling system, and in particular to a scheduling system suitable for use in a packet switched network for providing high-speed data transmission.

BACKGROUND TO THE INVENTION

One significant problem in data networks is that of congestion control, especially at switching nodes which receive incoming data packets from a number of channels, determine the next destination of the incoming packets, and then send the packets to their respective destinations.

There are many practical requirements for the queueing discipline in a switching node. It needs to be simple to implement, especially when the switching node operates at high speed. It needs to be robust in the presence of abnormal traffic generated by misbehaving sources either carelessly or subversively, and it needs to be fair: well-behaved sources should be protected in case of congestion.

Any switching procedure must also introduce minimal delay in the transmission of data. The question of delay is not too critical for non real-time data—for example Internet (IP) transmissions (though even there delay can be a significant problem), but delay is a serious and potentially fatal problem for real-time data transmission. For example in an ATM network, where an otherwise small delay would render video, for example, transmissions impossible or at best of low quality.

Unlike classic data networks, one of the attractive features of ATM-based broadband integrated service digital network (B-ISDN) is the guarantee of end-to-end quality of service (QoS) by the network. This requires the network to provide in each multiplexer or switching node enough buffers to avoid cell loss and to use the necessary scheduling algorithms to meet the requirement of minimal cell delay.

To meet this requirement one proposed method is known as self clocked fair queueing (SCFQ) which is illustrated schematically in FIG. 1. As can be seen from FIG. 1 each arriving packet i in a channel k is provided with a virtual time tag $F_k^i$ according to the following algorithm:

$$F_k^i = \frac{L_i^k}{S_k} + \max(F_k^{i-1}, \hat{v}(a_k^i))$$

Where $L_k^i$=the packet length of packet i in channel k
$S_k$=the guaranteed bandwidth of channel k
and $\hat{v}(a_k^i)$=the virtual time tag of the packet in service when packet i of channel k arrives.

The packets are then sorted in a queue based upon the time tag—the smaller the time tag the higher the priority given to the packet—and the packet at the head of the queue is then transmitted to a first-in-first-out (FIFO) server for onward transmission to a high-speed transmission link.

Such a system is very good at providing fairness between different traffic streams. However, the inherent complexity of this virtual time approach makes practical implementation very difficult and expensive. For example, since the virtual clock is the reference for all traffic streams it cannot be reset until all the streams are idle, which in fact seldom happens, which can lead to numerical overflow problems.

A further disadvantage is that the tagged arriving packets must be sorted which inevitably introduces a slight delay in the switching speed.

SUMMARY OF THE INVENTION

According to the present invention there is provided a packet scheduling system, comprising:
  a plurality of first-in-first-out buffers each corresponding to a respective input stream,
  means for allocating credit to each said buffer when said buffer contains at least one data packet and is unable to transmit,
  means for successively selecting a buffer holding data to be transmitted based on the credit allocated to said buffers and chosen fairness criteria,
  means for transmitting a waiting packet from a said selected buffer to an output transmission link, and
  means for reducing the credit of said selected buffer level upon transmission of a waiting packet from said selected buffer.

In preferred embodiments of the present invention it should be noted that each said buffer may comprise an independent buffer associated with a respective input stream, or said buffers may comprise a shared buffer in which each input stream is associated with a linked memory list.

The present invention is applicable both to networks having a variable data packet size such as IP networks, and also to networks in which the packet size is fixed, for example ATM networks.

In one preferred embodiment where the data packets are variable in size and wherein each input stream is allocated a share of the bandwidth of the output transmission link, the selecting means comprises means for determining the credit allocated to each input stream, the bandwidth allocated to each input stream, and the size of the head of line packets waiting to be transmitted in each input stream, and means for sorting the head-of-line packets in accordance with the difference between the size of the head of line packets and the allocated credit as a proportion of the allocated bandwidth, whereby the input stream having an allocated credit closest to the packet size as a proportion of allocated bandwidth is selected for transmission. Following transmission of a packet the credit for the transmitted input stream is reset to zero.

With tis arrangement a fair sharing of the available bandwidth amongst active streams may be obtained based on the reserved bandwidth share such that over a period of time the amount of traffic transmitted by one stream as a fraction of the total traffic transmitted by all streams will be equal to the bandwidth allocated to that stream as a proportion of the total available bandwidth. Other fairness criteria are also possible, however.

In an embodiment wherein the packet size is fixed and identical for all input streams, for example an ATM network, a simplified form of the invention may be employed.

In this embodiment an input stream with the largest reserved bandwidth is allocated as a default reference stream, and the means for selecting the stream to be transmitted comprises means for choosing randomly from all input streams having a credit allocation equal to or greater than the fixed packet size, and means for increasing the credit allocation of all the streams having packets to be transmitted that are unable to transmit by an incremental amount equal to the proportion of their respective bandwidth share to the bandwidth share of the default reference stream. Following transmission of a data packet from an input stream that stream has its credit allocation reduced by the size of a data packet.

The present invention is applicable to both work-conserving systems in which the unused bandwidth reserved for streams having no data packets to transmit is available for use by streams having data packets to transmit, and also non-work-conserving systems in which each stream only has available to it its own reserved bandwidth share.

In one embodiment of the invention corresponding to a non-work-conserving system for transmission of fixed packet size data, eg ATM, the system may be such that a predetermined time interval is defined equal to the time required to transmit one data packet, and wherein for each said time interval that a stream having packets to transmit is unable to transmit the credit for that stream is increased by an increment corresponding to the bandwidth share of that stream as a fraction of the total bandwidth of the output link, and wherein the means for selecting the stream to be transmitted comprises means for comparing the credit allocated to said streams and means for choosing the stream with the largest credit allocation. After a packet has been transmitted that stream has its credit allocation reduced by the size of a data packet.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 2:
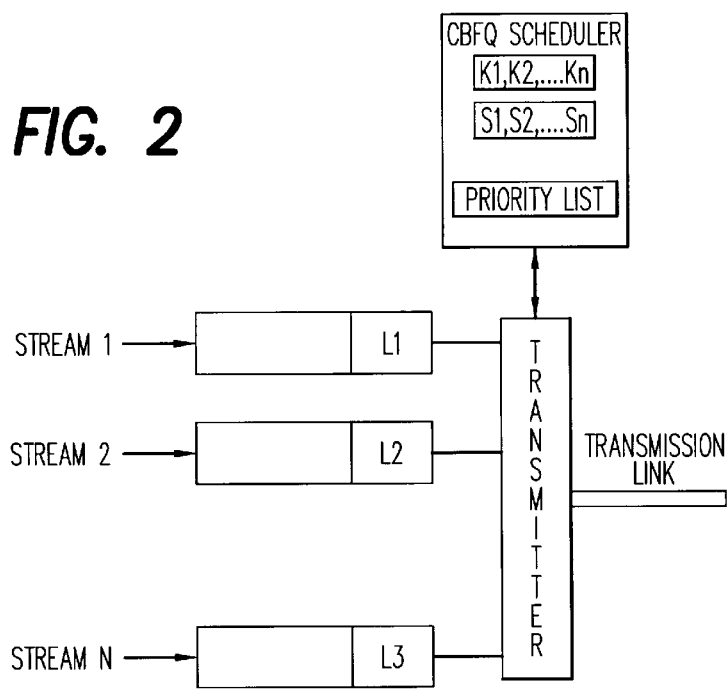
FIG. 2 illustrates schematically an embodiment of the present invention wherein each input stream is provided with an individual buffer.

FIG. 2 shows schematically a network node or ATM multiplexer in which a transmission link of speed C is shared between J independent streams having bandwidth S. The independent streams can represent either individual sources or aggregate streams of sources having the same quality of service (QoS) requirement.

Each incoming independent stream is associated with a dedicated first-in-first-out buffer. These buffers are independent and in each queue the packets are inserted on a FIFO basis and each time the queue is served the head of line (HOL) packet is extracted. As will be described below to each queue a CBFQ-based scheduler associates a counter $K_i$ and at the connection set-up each incoming stream is associated with a share of bandwidth $S_i$, i=1, . . . , J. To ensure stability the total bandwidth of the streams is such that $\Sigma_i S_i \leq C$.

An important aspect of the present invention is that credit is allocated to each incoming stream with reference to the onward transmission or otherwise of that stream. To this end a counter $K_i$ is associated to traffic stream i, i=1, . . . , J. As will be described in further detail below an incoming stream gains credit and the value of counter K increases when that stream has data traffic waiting to be transmitted, ie there is at least one waiting packet held in the buffer, but is unable to do so. If the buffer is empty and a given stream is not active, then no credit is allocated to that stream.

In the embodiment of FIG. 2 each stream is provided with an independent buffer. A shared buffer architecture is also possible, however, and an example of a such a possible architecture is shown in FIG. 3.

Figure 3:
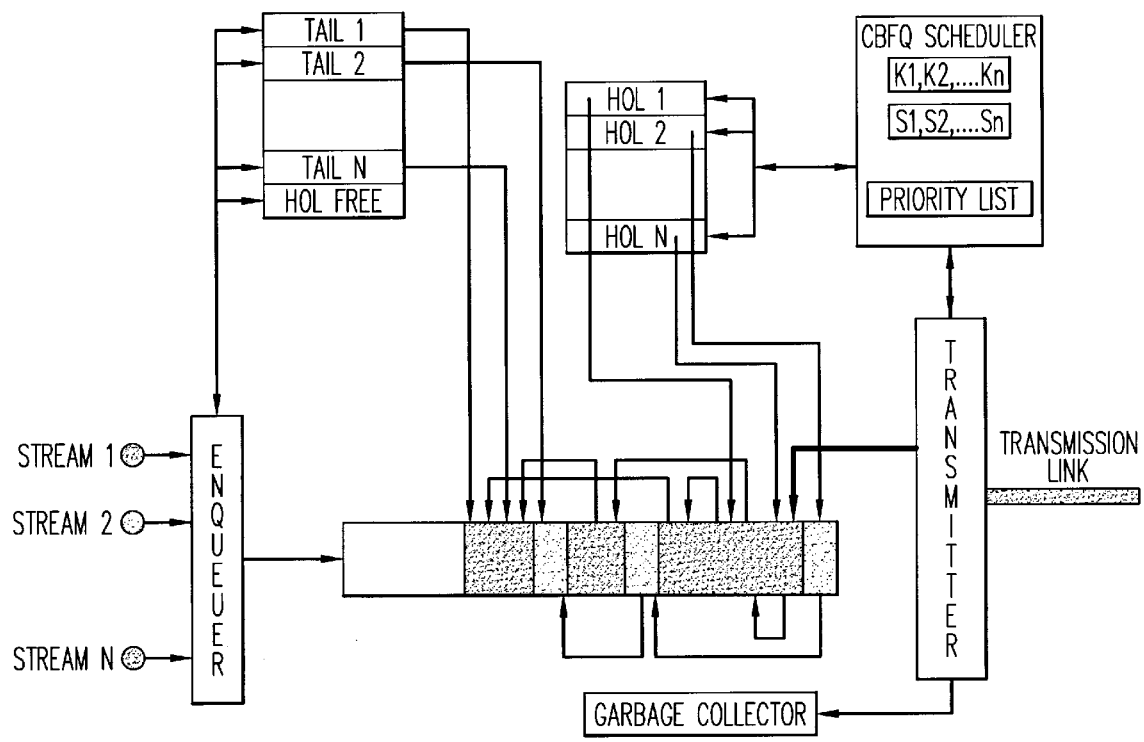
FIG. 3 illustrates schematically an embodiment of the present invention wherein a single buffer is shared between a number of input streams.

In the embodiment of FIG. 3 the different incoming streams share the same buffering facilities. However the different streams are logically managed on a per-stream basis. To each stream is associated a linked list of memory addresses pointing to the addresses of the packets of that stream. In this case, two additional variables per stream are needed: the address of the head of the packet, and the address of the tail packet of the stream. With these two variables, upon a packet arrival from stream i, the enqueuer allocates the necessary memory from the free memory stack pointed to by HOL FREE, links the allocated memory to the tail of the list of stream i and updates the pointer Tail i in the pointers table.

The service scheduler after selecting the stream, say stream i, that must be served—in a manner to be described below—based on the table of HOL pointers forwards the address of the HOL packet of stream i to the transmitter. The transmitter then sends the corresponding packet and forwards the memory address to the garbage collector which will return the memory freed by the transmitted packet to the head of the memory stack.

When the transmission link does become available, the scheduling system decides which stream will be transmitted next and then transmits the head of line (HOL) packet from the buffer associated with that stream. This decision is made based on factors such as the credit allocated to each stream, the packet size of the HOL packet in each stream and the bandwidth share of each stream. The precise manner in which these factors are balanced and weighted, however, can vary depending on the nature of the data transmission, eg whether it is IP or ATM, fixed bandwidth, work conserving or non-work conserving and so on. One of the advantages of the present invention lies in its flexibility and in the way it can easily be adapted—as will be described in further detail below—to accommodate such different factors.

The general algorithm upon which the decision is to be made is set out below.

1. Initialize:
   At the beginning of operation, set all the counters to zero: $K_l=0$, l=1, . . . , J
2. Loop:
   Let $\mathcal{J}=\{j_1, \ldots, j_k\}$ and $|\mathcal{J}|=k$ such that Queues $j_1, \ldots, j_k$ are currently backlogged;
3. Let $L_{j_n}$ be the size of the HOL packet of Queue $j_n \in \mathcal{J}$;
4. Sort the backlogged queues according to:

$$\frac{L_{j_1} - K_{j_1}}{S_{j_1}} \leq \frac{L_{j_2} - K_{j_2}}{S_{j_2}} \leq \ldots \leq \frac{L_{j_k} - K_{j_k}}{S_{j_k}}$$

5. Transmit the HOL packet of Queue $j_1$, and up-date the counters as follows:

$$K_{j_n} \leftarrow K_{j_n} + \frac{L_{j_1} - K_{j_1}}{S_{j_1}} \cdot S_{j_n}, \forall j_n \in \mathcal{J} \setminus \{j_1\}$$

$$K_{j_1} \leftarrow 0$$

6. End loop (Goto 2).

Thus in this arrangement the next HOL packet to be transmitted is the one in the stream $j_1$ having a sufficient amount of earned credit, with reference to the available bandwidth, to make it the closest to the required amount of time for that packet to be transmitted. The counter for the transmitted stream is then reset at zero, ie zero credit which must then be earned again, while all remaining streams are given additional credit and the algorithm is then repeated for the next packet to be transmitted.

A number of important points should be noted. Firstly only backlogged streams with packets to transmit are given credit when another stream transmits. Empty channels not currently having channels to transmit are not given credit. This prevents problems arising when a silent channel accumulates a vast amount of credit which then allows it to block all other channels once it acquires data to transmit.

Secondly, a counter value for one stream is reset whenever that stream is transmitted which means that values for K are bounded and unlike prior time-tag proposals in which the clock can only be reset when all streams are quiet there is no numerical overflow problem.

The decision over which stream will next be transmitted is not simply based upon which stream has the greatest amount of credit, but on other parameters such as the size L of the packet to be transmitted and the bandwidth S allocated to a particular stream. The smaller the packet size and the larger the bandwidth, the greater the chance of a packet from a given stream is transmitted next. These parameters may be selected appropriately or may be given different weighting, and this makes it possible to implement easily different fairness criteria in different circumstances.

The embodiment described above uses fairness criteria that provide a "fair" sharing of the total available bandwidth among active streams (ie the streams that have packets waiting for transmission) based on the reserved bandwidth shares. That is to say, if two streams i and j are active and have reserved bandwidth shares $S_i$ and $S_j$ respectively, then in any time interval where they are continuously active the amount of traffic transmitted by the two streams $W_i$ and $W_j$ should be proportional to their bandwidth shares.

To achieve this the present embodiment applies a selection scheme based on the size of the HOL packet, the counter value K and the bandwidth share. Other fairness criteria, however, might be based, for example, on the queue lengths of the different active streams. For example each traffic stream may be guaranteed a reserved bandwidth share $S_i$ first. Any extra bandwidth available from some of the idle traffic streams can be equally divided among all the active traffic streams instead of proportionally divided according to the bandwidth shares of the active streams. This avoids letting the stream with a larger bandwidth share obtaining a larger portion of the extra available bandwidth. This fairness definition implies that all active streams have equal priority to access the extra available bandwidth.

A simpler implementation of the general algorithm can be realized by using the counters to keep track of the remaining time to earn enough credits for the head-of-line (HOL) packet transmission. This is equivalent to letting a new variable $T_i$ be defined as follows:

$$T_i \equiv \frac{L_i - K_i}{S_i}, i = 1, \ldots, J,$$

where $T_i$ represents the remaining time for stream i to earn enough credits for the HOL packet transmission. $T_i$ should be initialised to $L_i/S_i$ when a packet of stream i first reached the HOL position. With this change of variable from $K_i$ to $T_i$ step 4 of the general algorithm becomes:

$$T_{j1} \leq T_{j2} \leq \ldots \leq T_{jk}$$

and step 5 becomes:

$$T_{jn} \leftarrow T_{jn} - T_{j1}, \forall j_n \in \mathcal{J} \setminus \{j_l\}$$

Furthermore the present invention provides a general architecture that can easily be implemented in different forms of data networks, such as IP, ATM and non-work conserving networks.

For example, the above described algorithm is a general one for both IP (variable packet size) and ATM (fixed packet size). However, if the network is an ATM network the packet size is always 1 and is the same for all streams. Since the packets are then so short the time available to decide which packet to transmit next is also very short and therefore a long sorting time is not acceptable. To avoid this sorting time and to reduce the per packet processing complexity the algorithm can be simplified further to reduce the processing overheads for a more practical implementation by taking into account the fact that all packets in an ATM network are of a given fixed size (ie all values for L are equal).

Thus for an ATM network the algorithm may be simplified as follows:

1. Initialize: At the beginning of operation, set all the counters to zero:
   $K_l = 0, l = 1, \ldots, J$
2. Loop 1: Let $\mathcal{J} = \{j_1, \ldots, j_k\}$ and $|\mathcal{J}| = k$ such that Queues $j_1, \ldots, j_k$ are currently backlogged and $S_{j1} \geq S_{j2} \geq \ldots \geq S_{jk}$
3. Update the counters as follows:

$$K_{j_n} \leftarrow K_{j_n} + \frac{S_{j_n}}{S_{j_1}}, \forall j_n \in \mathcal{J}$$

4. Let $\kappa = \{l \in \mathcal{J} : K_l \geq 1\}$
5. Loop 2 (while $\kappa$ is non-empty)
   Serve one cell from queue $l\kappa$ $\kappa$ and update its counter by $$K_l \leftarrow \begin{cases} K_l - 1 & \text{if queue } l \text{ is non-empty;} \\ 0 & \text{if queue } l \text{ is empty.} \end{cases}$$

$\kappa \leftarrow \kappa \setminus \{l\}$.

End Loop 2
6. End Loop 1 (Goto 2).

In this embodiment the system first transmits one fixed size packet from a reference stream which has the largest reserve bandwidth share and all the other active streams earn credits according to the ratio between their reserved bandwidth share and the largest reserved bandwidth share (thus the amount of credit earned is always less than 1). Before coming back to transmit another packet from the reference stream all streams that have a counter size equal to or greater than 1 are eligible for transmission (since the packets are of size 1). In such a situation if there is one stream with a counter greater than 1 then the HOL packet from that stream is transmitted. If there is more than one stream with a counter greater than 1 then the next stream to be transmitted is chosen randomly to avoid sorting. This avoidance of sorting is achieved at the expense of a little fairness (ie the streams transmit an amount of traffic nearly proportional to their bandwidth share).

After a packet has been transmitted from a stream its counter is not reset to zero in this embodiment but rather is reduced by an increment of 1 (ie by the fixed packet size).

The above described systems are suitable for work-conserving applications. However, the scheduling system of the present invention is suitable for use in both work-conserving and non-work-conserving applications. In a work-conserving discipline the idle bandwidth from the empty queues can be used to improve the system performance in a single node. However this is at the price of the traffic pattern being distorted in the network due to network load fluctuations and down-stream nodes may be unable to deal with bursty traffic. Furthermore in order to derive end-to-end delay bounds and buffer space requirements in a network environment the traffic needs to be characterized inside the network on a per connection basis, but if the traffic flow is distorted there are a number of difficulties in deriving the traffic characteristics and therefore guaranteed performance services may be better obtained using a non-work-conserving discipline even at the cost of wasted bandwidth.

Several non-work-conserving algorithms have been proposed in the prior art but they all require a very different architecture from their work-conserving counterparts. As a practical matter it can be very difficult to implement two different architectures in a single switch and one of the advantages of the present invention is that it provides a uniform architecture supporting both work-conserving and non-work-conserving disciplines.

In non-work-conserving disciplines each user will be served at the rate of its reserved bandwidth and even when there is only one backlogged queue in the system, it cannot use the idle bandwidth of the other queues. Therefore the credit $K_j$ for backlogged queue j will increase only according to the time interval $\Delta t=1/C_{total}$ and the packet can only be served when the credit value is at least equal to the packet size.

The following is an algorithm for a non-work-conserving ATM application (ie with fixed packet size): In this algorithm a time slot is defined as the time interval needed for transmitting one cell by using the link capacity C. Here $S_i$, i=1, . . . , J, denotes the fraction of the link capacity reserved for stream i.

1. Initialize: At the beginning of operation, set all the counters to zero:

$K_l=0$, l=1, . . . , J.

2. Loop: Let $\mathcal{J}=\{j_1, \ldots, j_k\}$ and $|\mathcal{J}|=k$ such that Queues $j_1, \ldots, j_k$ are backlogged;

3. $K_{jn} \leftarrow K_{jn}+S_{jn}, \forall j_n \in \mathcal{J}$

4. Let $\kappa=\{l \in \mathcal{J}: K_l \geq 1\}$

5. If $\kappa$ is empty then waste one time slot and goto 2.

6. Let $\{j_1, j_2, \ldots, j_M\}$ be the permutation of the elements of $\kappa$, such that $K_{j_1} \geq K_{j_2} \geq \ldots \geq K_{j_M} \geq 1$ 7. Serve one cell from queue $j_1$ and $$K_{j_1} \leftarrow \begin{cases} K_{j_1} - 1 & \text{if queue } j_1 \text{ is still non-empty;} \\ 0 & \text{if queue } j_1 \text{ is empty.} \end{cases}$$

8. End Loop (Goto 2)

In this embodiment a time slot is defined by the time required to transmit one packet. For every time slot that an active stream is waiting to transmit its counter is increased by its reserved bandwidth share expressed in terms of a fraction of the total link capacity. Whenever the counter value reaches 1 (again because this is an ATM system in which the packet size is fixed at 1) the corresponding stream becomes eligible for transmission. Amongst all the eligible streams the stream with the largest counter value is transmitted and the counter for that stream is reduced by 1 while the counters of the other active streams all increase by their bandwidth share. To assess the performance of the system of the present invention a computer simulation was performed using the simulation techniques described in *Simulation Modeling and Analysis*, Averill M. Law & W. David Kelton, 2nd Edition, McGraw-Hill, Inc. which is incorporated herein by reference.

In the simulation an ATM switch node fed by three independent on/off traffic streams with the same traffic parameters is considered. The three streams share the same output link with capacity C=100 cells/sec. The buffer size of the switch is infinite.

Using this switch node model three different scheduling algorithms are used to serve the traffic and their performance is compared for different network loads. The three algorithms are a conventional self-clocked fair queueing network (SCFQ), a credit based fair queueing system according to the present invention (CBFQ), and a simplified version of the system of the present invention adapted for fixed packet size (CBFQ-F). The peak rate of each stream is 100 cells/sec and the mean silent period is 0.3 seconds. By changing the mean burst size of the streams a network load defined as 3*mean-rate/C can be obtained. The following table shows the network load for different mean burst sizes used in the simulation.

| Case | Mean Burst Size (cells) | Network load (3*mean-rate/C) |
| --- | --- | --- |
| 1 | 6 | 0.50 |
| 2 | 8 | 0.63 |
| 3 | 9 | 0.69 |
| 4 | 10 | 0.75 |
| 5 | 11 | 0.81 |
| 6 | 12 | 0.86 |
| 7 | 13 | 0.91 |
| 8 | 14 | 0.96 |
| 9 | 15 | 0.99 |

Figure 1:
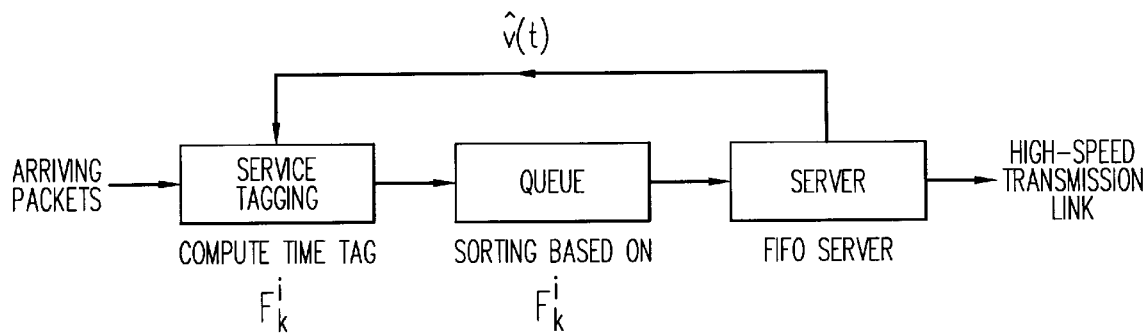
FIG. 1 illustrates schematically a prior art scheduling proposal.
Figure 4:
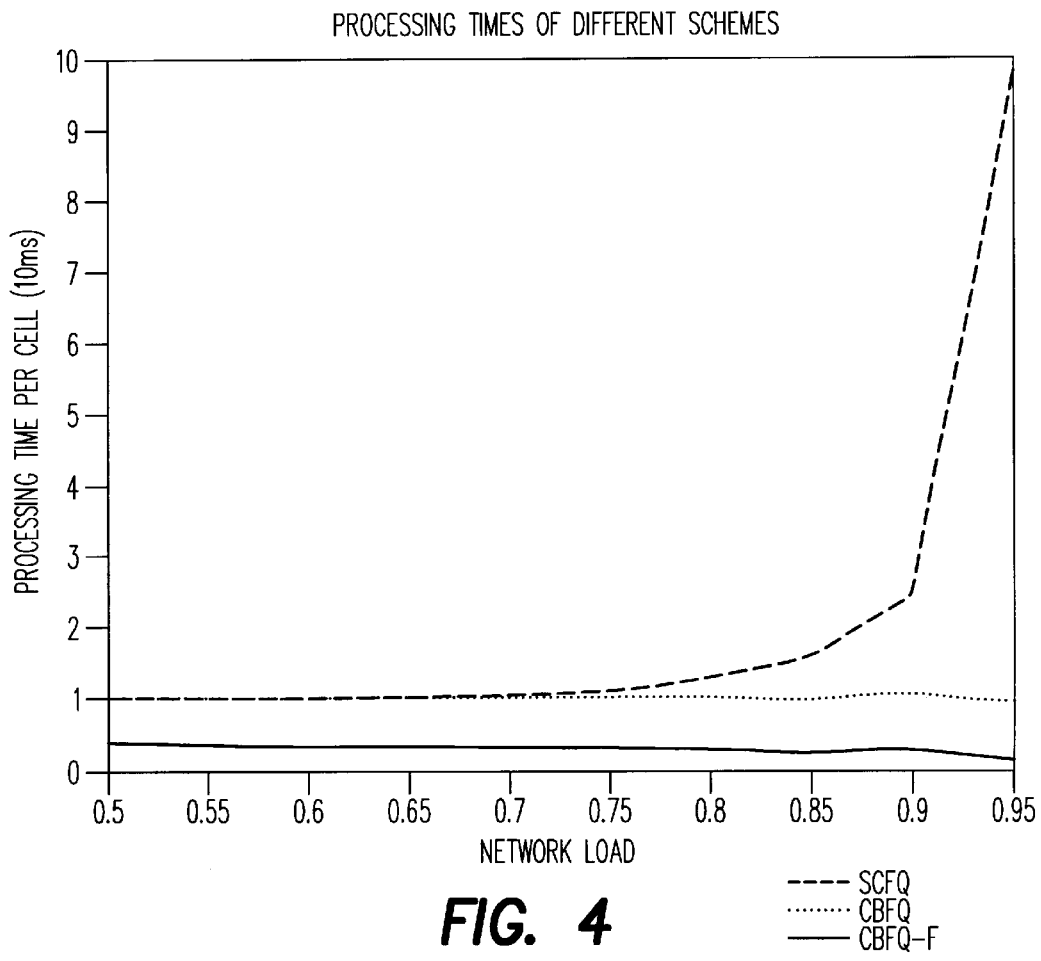
FIG. 4 is a plot comparing the packet processing time as a function of network load of a SCFQ system in comparison with two embodiments of the invention.

FIG. 4 shows the processing time per cell as a function of network load. From this it can be seen that the processing time for a conventional SCFQ system increases almost exponentially with increasing load. For the CBFQ system however, the computational complexity of the system is $O(\log(J))$ where J is the total number of streams. Since the number of streams is constant and independent of the network load there is no significant variation in the processing time as the load increases.

The simplification of the present invention in the algorithm of the CBFQ-F system is such that the computational complexity is $O(\log(1))$ and thus the processing time for the CBFQ-F system is even smaller and as with CBFQ is substantially constant and does not vary with network load.

This simulation clearly shows the advantage of the present invention over the prior art. Furthermore, the simulation uses only three input streams and in practice the benefits provided by the present invention are likely to be even greater where the number of streams is larger (as in practice is likely).

For the sake of completeness a non-work conserving IP algorithm is set out below. In this embodiment a time slot is defined as the time interval needed for transmitting the smallest packet by using the link capacity C. Here $S_i$, i=1, . . . , J, denotes the capacity reserved for stream i.

1. Initialize: At the beginning of operation, set all the counters to zero:

$K_l=0$, $l=1, \ldots, J$; and let $\Delta t=1$ slot time.

2. Loop: Let $\mathcal{J}=\{j_1, \ldots, j_k\}$ and $|\mathcal{J}|=k$ such that Queues $j_1, \ldots, j_k$ are backlogged;

3. $K_{jn} \leftarrow K_{jn}+S_{jn}\cdot \Delta t$, $\forall j_n \in \mathcal{J}$ 4. Let $\kappa=\{l \in \mathcal{J}: K_l \geq L_l\}$ 5. If $\kappa$ is empty then waste one time slot, let $\Delta t=1$ slot time, and goto 2.

6. Let $\{j_1, j_2, \ldots, j_M\}$ be the permutation of the elements of $\kappa$, such that $$\frac{K_{j_1}}{L_{j_1}} \geq \frac{K_{j_2}}{L_{j_2}} \geq \ldots \geq \frac{K_{j_M}}{L_{j_M}} \geq 1$$

7. Serve one cell from queue $j_1$ and $$K_{j_1} \leftarrow \begin{cases} K_{j_1} - L_{j_1} & \text{if queue } j_1 \text{ is still non-empty;} \\ 0 & \text{if queue } j_1 \text{ is empty.} \end{cases}$$

and $$\Delta t = \frac{L_{j_1}}{C}$$

8. End Loop (Goto 2)

We claim:

1. A packet scheduling system for packets of variable size, comprising:

a plurality of first-in-first-out buffers each corresponding to a respective input stream of data packets that is allocated a share of the bandwidth of an output transmission link, means for allocating credit to each said buffer when said buffer contains at least one data packet and is unable to transmit, means for successively selecting a buffer holding data to be transmitted based on the credit allocated to said buffers and chosen fairness criteria, including means for determining the credit allocated to each buffer, the bandwidth allocated to each input stream, and the size of the head-of-line packet waiting to be transmitted in each buffer, means for sorting said head-of-line packets in accordance with the difference between said packet size and said allocated credit as a proportion of the bandwidth allocated to the associated input stream, whereby the buffer having an allocated credit closest to the packet size as a proportion of allocated bandwidth of its associated input stream is selected for transmission, and means for increasing the credits of all the buffers having packets to be transmitted which are unable to transmit by an incremental amount equal to the proportion of their respective stream's bandwidth share to the bandwidth share of the stream associated with the selected buffer, multiplied by the difference between the transmitted packet size and the allocated credit of the stream associated with the selected buffer, means for transmitting a waiting packet from a selected buffer to said output transmission link, and means for reducing the credit of said selected buffer upon transmission of a waiting packet from said selected buffer.

2. A system as claimed in claim 1 wherein each said buffer comprises an independent buffer associated with a respective input stream.

3. A system as claimed in claim 1 wherein said buffers comprise a shared buffer in which each input stream is associated with a linked memory list.

4. A system as claimed in claim 1 wherein after transmitting a packet from one stream the counter corresponding to that stream is reset to zero.

5. A packet scheduling system for packets which are all of a fixed size, comprising:

a plurality of first-in-first-out buffers each corresponding to a respective input stream of data packets that is allocated a share of the bandwidth of an output transmission link, where a stream with the largest reserved bandwidth is designated as a default reference stream, means for allocating credit to each said buffer when said buffer contains at least one data packet and is unable to transmit, means for successively selecting a buffer holding data to be transmitted based on the credit allocated to said buffers and chosen fairness criteria, including means for choosing randomly from all the buffers having an allocated credit equal to or greater than a normalized fixed packet size, and in the absence of any such buffer the buffer associated with the reference stream, and means for increasing the credits of all the buffers having packets to be transmitted which are unable to transmit by an incremental amount equal to the proportion of their associated stream's respective bandwidth share to the largest bandwidth share of any stream, means for transmitting a waiting packet from a selected buffer to said output transmission link, and means for reducing the credit of said selected buffer upon transmission of a waiting packet from said selected buffer.

6. A system as claimed in claim 5 wherein each stream that is transmitted has its credit reduced by the normalized fixed packet size.

7. A system as claimed in claim 5 wherein the unused bandwidth allocated to streams having no data packets to transmit is available for use by streams having data packets to transmit.

8. A system as claimed in claim 5 wherein each stream only has available its respective bandwidth share.

9. A packet scheduling system for data packets which are all of a fixed size and transmitted via input streams that are allocated a respective share of the bandwidth of an output transmission link, wherein unused bandwidth allocated to streams having no packets to transmit is available for use by streams having a packet to transmit, and wherein a predetermined time interval is defined equal to the time required to transmit one data packet, comprising:

a plurality of first-in-first-out buffers each corresponding to a respective input stream of data packets, means for allocating credit to each said buffer when said buffer contains at least one data packet and is unable to transmit, wherein for each time interval that a buffer having packets to transmit is unable to transmit the credit for that buffer is increased by an increment corresponding to the bandwidth share of its associated stream as a fraction of the total bandwidth of the output link, means for successively selecting a buffer holding data to be transmitted based on the credit allocated to said buffers and chosen fairness criteria, including means for comparing the credit allocated to said buffers and means for choosing the buffer with the largest credit allocation, means for transmitting a waiting packet from a selected buffer to said output transmission link, and means for reducing the credit of said selected buffer upon transmission of a waiting packet from said selected buffer.

10. A system as claimed in claim 9 wherein each stream that is transmitted has its credit allocation reduced by the size of a data packet.

* * * * *